Figure 1:
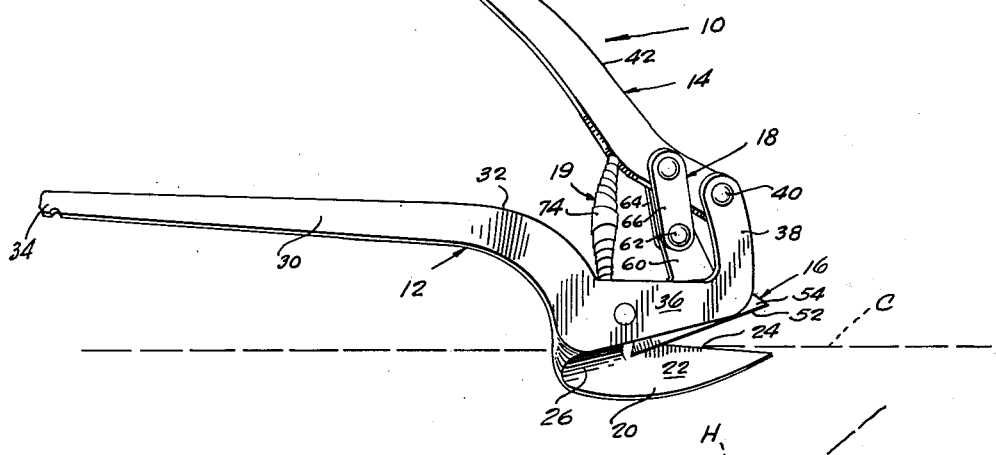

May 21, 1963 L. CHONKA 3,090,121
HEAVY DUTY SHEARS
Filed Jan. 23, 1962

INVENTOR.
LOUIS CHONKA,
BY
Frederick C. Bromley
ATTORNEY.

United States Patent Office 3,090,121
Patented May 21, 1963

3,090,121
HEAVY DUTY SHEARS
Louis Chonka, Port Colbourne, Ontario, Canada, assignor of one-fourth to August Szabo, Port Colbourne, Ontario, and one-fourth to Gustav Z. Szabo, Guelph, Ontario, Canada
Filed Jan. 23, 1962, Ser. No. 168,207
1 Claim. (Cl. 30—251)

This invention relates generally to cutting tools, and more particularly to an improved heavy duty shears particularly adapted for cutting sheet metal or the like.

Conventional "tin snips" include a pair of hand gripped levers, diagonally crossed and intermediately pivoted and includes overlying cutting edges movable toward each other as the levers are moved toward each other. The amount of force that can be applied is directly related to the length of the levers from the pivot axis thereof. The cutting plane of conventional tin snips is located at the point of engagement of the hand levers and when cutting long sheets of metal or the like, one side of the sheet must be bent out of the general plane of the sheet being cut and a considerable amount of effort and skill is required to make accurate cuts.

A primary object of the present invention is to provide a heavy duty shear especially adapted for cutting sheet metal and the like and which affords greater ease of operation, protection to a user, less effort and skill than is required when using conventional "tin snips."

Another object of the invention is to provide novel shears in which a compound lever action is provided to a single displaceable cutting jaw and in which a user's hand is substantially spaced above the cutting plane of the tool.

The foregoing objects generally indicate the character of the subject invention; however, other and more specific objects will become apparent from a consideration of the following description taken in conjunction with the accompanying drawings, wherein an exemplary embodiment of the invention is disclosed.

Figure 2:
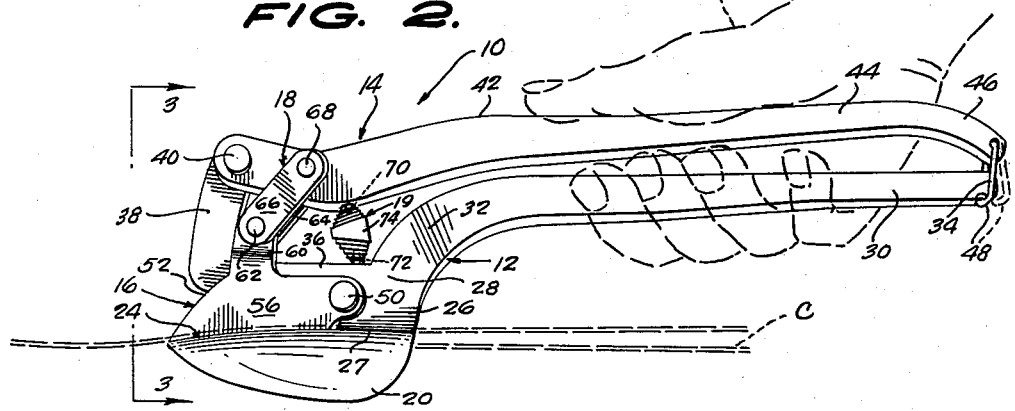
Figure 3:
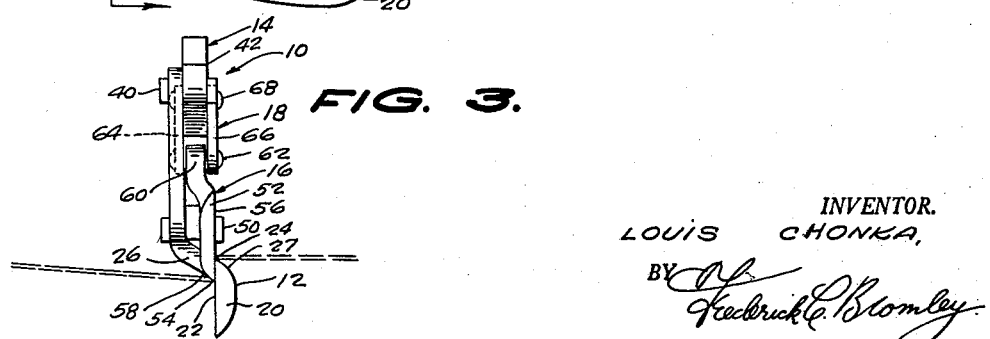

In the drawings:

FIGURE 1 is a side elevation of the novel shears of this invention, showing by dotted lines the general cutting plane of the tool, and showing the position of the parts prior to a cutting stroke;

FIGURE 2 is a side elevation, looking at the side opposite that shown in FIGURE 1, illustrating the position of the parts after the completion of a cutting stroke, and showing by dotted lines the general position of a sheet of metal being cut and the position assumed thereby with respect to a user's hand; and FIGURE 3 is a front elevation looking in the direction indicated by the plane of line 3—3 of FIGURE 2.

Referring to the drawings in detail, the novel heavy duty shear is indicated generally at 10 and comprises a fixed jaw 12, a force transmitting lever 14, a displaceable jaw 16, a force transmitting link 18 and return spring means 19.

The fixed jaw 12 includes a fixed vertically extending lower blade 20, when considered with respect to a horizontal cutting plane C. The lower cutting blade 20 includes at the upper edge 24 of the inner surface 22 a substantially linear cutting edge which merges into an offset heel portion 26. The blade 20 is relieved at 27 angularly away from cutting edge 24 along its entire length.

The fixed jaw 12 includes at the heel portion 26 a rear vertically extending support portion 28 which is offset with respect to a vertical plane passing through the cutting edge 24. The support portion 28 continues in a rearwardly extending lower lever or handle 30 which may be offset at 32 to be disposed in substantially coplanar alignment with the cutting edge 24 or the vertical plane passing therethrough. The handle 30 includes a rear depending hook portion 34.

The rear support portion 28 includes a forwardly extending, plate-like portion 36 extending substantially parallel to and spaced from the side 22 of the blade 20 and terminates in a forward, vertically extending support portion 38.

The support portion 38 is transversely apertured and has terminally pivoted at 40, in substantially coplanar relation with the space between side 22 and adjacent side of portion 36, a rearwardly extending force transmitting lever 42 including a rear handle portion 44 substantially coplanar with handle portion 30. The handle portion 44 includes a downwardly curved, transversely apertured rear end portion 46 to which is pivotally connected a ring element 48 engageable over hook portion 34 on handle portion 30.

Pivotally mounted on a transverse pivot axis of element 50, intermediately of portion 36 of the fixed blade 20, is a displaceable jaw blade 52 which will be oscillated within the spaced substantially parallel surfaces of portion 36 and side 22 in substantially coplanar relation with lever 42. The blade 52 includes at the lower edge 54 of inner face or surface 56 a cutting edge which is relieved angularly upwardly over its entire length, as indicated at 58. The intersection of cutting edges 22, 55, as seen in FIGURE 2, defines the cutting plane C substantially below a user's hand H on handle portion 30 and thus the user is not subjected to the danger of cuts due to sharp edges, for example.

The displaceable blade includes an upper transversely apertured, mounting plate portion 60 to which is pivotally connected by a pin 62 the lower ends of a pair of force transmitting links 64, 66 disposed on opposite sides of the portion 60. The links 64, 66 are pivotally connected at 68 on opposite sides of lever 42 rearwardly of pivot 40 of the lever 42.

The movable lever 42 and portion 36 of the fixed blade respectively include a depending pin 70 and vertically extending pin 72; see FIGURE 2, receiving thereon upper and lower ends of a tubular compression spring 74 comprising the spring means 19.

The tool is normally maintained in the condition shown in FIGURE 1 when the ring element 48 is released from the hook portion 34. When the handle portion 44 is moved toward handle portion 30; see FIGURE 2, about the pivot 40, links 64, 66 move toward the position shown in FIGURE 2 and the spring 74 is compressed. Only the blade 52 is moved and the cutting line is readily observed by the user.

The user's hand is well above the material being cut and the compound lever arrangement requires minimum effort to make a cut. The lever 42 is in direct overlying relation to the blade 52 and thus a direct application of force occurs. Finally, the angularly relieved portions of the blade cause relatively little displacement of the material being cut out on the general cutting plane, and circular cuts may be easily performed.

It will be obvious to those skilled in the art that various changes may be made without departing from the spirit of the invention and therefore, the invention is not limited to what is shown and described in the specification but only as defined in the appended claims.

What is claimed is:

Heavy duty shears for cutting sheet metal and the like comprising a fixed, elongated lower jaw having an inner vertical surface and an upper cutting edge in the plane of said inner surface and substantially along the length thereof, said lower jaw including a rear support portion offset laterally across the plane of said inner vertical surface and including a connecting portion having an upper surface substantially level with said cutting edge, said rear support portion further including an elongated handle portion extending rearwardly therefrom and disposed at a higher elevation than said upper cutting edge, said rear support portion including a forwardly extending portion having an inner vertical thrust surface parallel to said inner vertical surface of said fixed jaw and spaced therefrom and extending substantially the length of said cutting edge, said forwardly extending portion forwardly terminating in an upwardly extending forward support portion, a force-transmitting lever terminally connected on a transverse pivot axis on said forward support portion and including a rear handle portion overlying said first-mentioned handle portion of said fixed jaw, a displaceable jaw movably interposed in a vertical plane between said fixed jaw and said forwardly extending support portion and connected on a transverse pivot axis on said rear support portion, said displaceable jaw having an inner vertical surface and a lower cutting edge in the plane of said inner vertical surface thereof wiping the inner vertical surface of said fixed jaw, said displaceable jaw further having an outer vertical thrust surface parallel to said inner vertical thrust surface of said forwardly extending portion for bearing thereagainst in a cutting operation, and a force-transmitting link connected between said force transmitting lever and said displaceable jaw on transverse pivot axes rearwardly of said pivot axis of said force-transmitting lever and forwardly of the transverse pivot axis of said displaceable jaw, respectively.

References Cited in the file of this patent

UNITED STATES PATENTS

| | | |
|---|---|---|
| 1,447,483 | Pazos | Mar. 6, 1923 |
| 2,207,222 | McGary | July 9, 1940 |
| 2,207,223 | McGary | July 9, 1940 |

FOREIGN PATENTS

| | | |
|---|---|---|
| 293,211 | Switzerland | Dec. 1, 1953 |